(12) United States Patent
Izumi

(10) Patent No.: US 8,031,395 B2
(45) Date of Patent: Oct. 4, 2011

(54) OPTICAL TRANSMISSION SYSTEM USING RAMAN AMPLIFIER AND CONTROLLING METHOD THEREOF

(75) Inventor: Futoshi Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 241 days.

(21) Appl. No.: 12/230,940

(22) Filed: Sep. 8, 2008

(65) Prior Publication Data
US 2009/0207482 A1 Aug. 20, 2009

(30) Foreign Application Priority Data

Feb. 14, 2008 (JP) ................... 2008-033631

(51) Int. Cl.
*H04B 10/17* (2006.01)
*H04B 10/12* (2006.01)

(52) U.S. Cl. ............... 359/334; 359/341.3; 359/341.33

(58) Field of Classification Search .............. 359/334, 359/341.3, 341.33
See application file for complete search history.

(56) References Cited

U.S. PATENT DOCUMENTS

| 6,259,554 B1 * | 7/2001 | Shigematsu et al. ......... 359/337 |
| 6,532,102 B2 | 3/2003 | Kobayashi et al. |
| 6,681,079 B1 * | 1/2004 | Maroney ........................ 398/15 |
| 6,850,360 B1 * | 2/2005 | Chen et al. ................... 359/334 |
| 6,891,659 B2 | 5/2005 | Kikuchi |
| 2002/0114061 A1 * | 8/2002 | Naito et al. .................. 359/334 |
| 2003/0011855 A1 * | 1/2003 | Fujiwara ....................... 359/177 |
| 2003/0030860 A1 * | 2/2003 | Mellert et al. ................ 359/110 |
| 2003/0030861 A1 * | 2/2003 | Mellert et al. ................ 359/110 |

FOREIGN PATENT DOCUMENTS

| JP | 2002-221743 | 8/2002 |
| JP | 2002-252595 | 9/2002 |

* cited by examiner

*Primary Examiner* — Eric Bolda
(74) *Attorney, Agent, or Firm* — Staas & Halsey LLP

(57) ABSTRACT

The optical transmission system modulates backward Raman pump light provided to an optical transmission line on one link side of an uplink and downlink, to thereby transmit a pilot signal for confirming a connection state of the optical transmission line to a node on an upstream side. When the pilot signal is received by the node on the upstream side, the backward Raman pump light provided to the optical transmission link on the opposite link side is modulated to thereby send back a response signal to an own node. Then by confirming receipt of the response signal at the own node, the backward Raman pump light provided to the optical transmission line on the one link side is changed over from a low output state to a high output state.

9 Claims, 10 Drawing Sheets

FIG.8
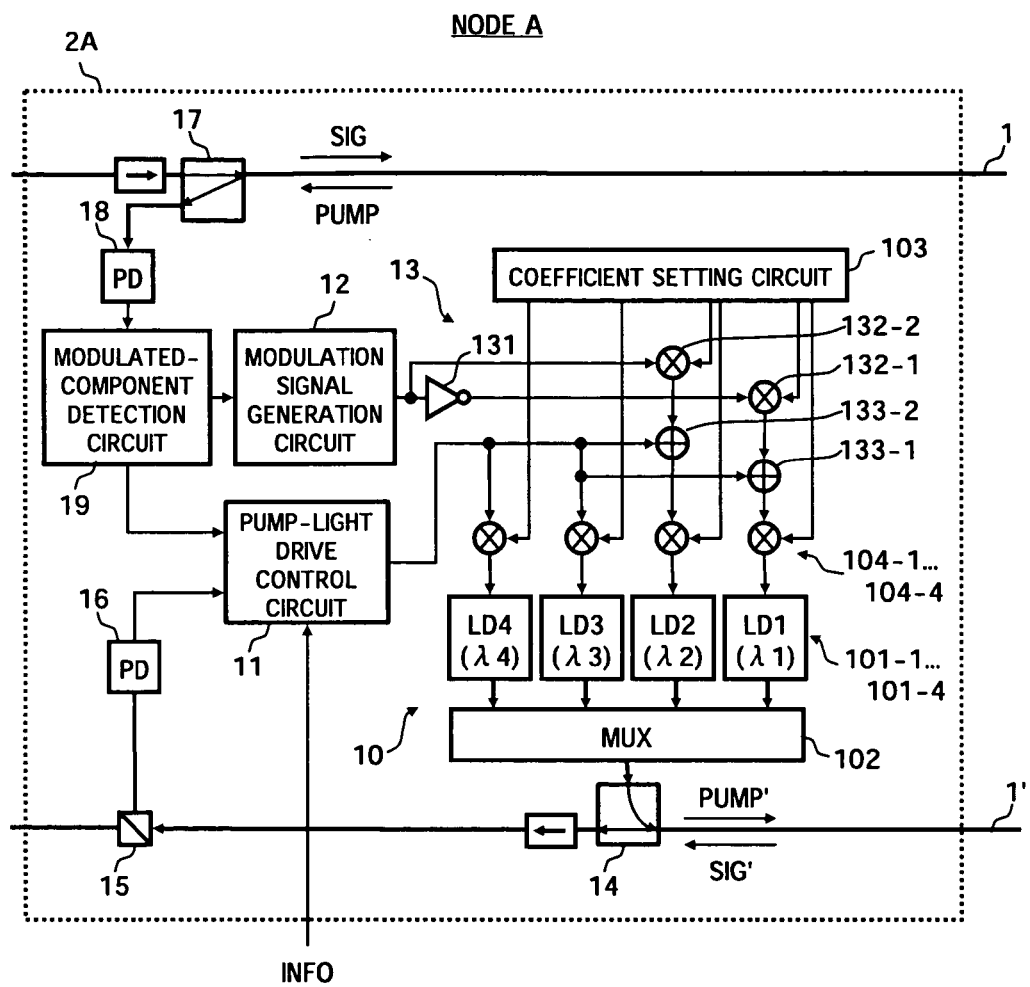
FIG.9
MODULATION PATTERN OF PUMP LIGHT SOURCE 101-1
MODULATION PATTERN OF PUMP LIGHT SOURCE 101-2
→ TIME

OPTICAL TRANSMISSION SYSTEM USING RAMAN AMPLIFIER AND CONTROLLING METHOD THEREOF

CROSS-REFERENCE TO RELATED APPLICATION

This application is based upon and claims the benefit of priority of the prior Japanese Patent Application No. 2008-033631, filed on Feb. 14, 2008, the entire contents of which are incorporated herein by reference.

FIELD

The embodiment relates to an optical transmission system that transmits a main signal light propagating on an optical transmission line while performing Raman amplification, and in particular relates to an optical transmission system that confirms a connection state of the optical transmission line and performs output control of Raman pump light, and to a controlling method thereof.

BACKGROUND

Recently, a long-distance optical transmission system using a Raman amplifier has been put to practical use as a system that realizes long distance transmission of wavelength division multiplexing (WDM) signal light. The Raman amplifier injects pump light from a reception side into an optical transmission line serving as an amplifying medium, and makes the pump light propagate in a direction opposite to a propagation direction of a signal light, to thereby amplify the signal light propagating on the optical transmission line by an effect of stimulated Raman scattering.

As one important function in the optical transmission system using the Raman amplifier, there is an optical output control function of the Raman amplifier. That is to say, in order to obtain a Raman gain in the optical transmission line, the Raman amplifier needs to inject pump light having an extremely high optical output power into the optical transmission line. Therefore, a safety measure for the pump light output from the Raman amplifier to the optical transmission line becomes important. Specifically, as the safety measure, since the power of the pump light output from the Raman amplifier to the optical transmission line at the time of normal operation becomes a high level of a level that may have a dangerous effect on a human body, it is required to reliably detect an abnormal state of the system (for example, when an output terminal of the Raman amplifier is disconnected), and stop the output of the pump light from the Raman amplifier, or decrease the output power of the pump light to a safe level.

As conventional technology for confirming whether the output terminal of the Raman amplifier and the optical transmission line are securely connected to each other, for example, in Japanese Laid-open Patent Publication No. 2002-252595 there is disclosed a method of determining a connection state of the output terminal of the Raman amplifier by confirming communication of an optical supervisory channel (OSC) transferred between optical transmission devices on the system.

Moreover, for example, in Japanese Laid-open Patent Publication No. 2002-221743, there is proposed a technique in which Raman pump light is modulated and transmitted to the optical transmission line, and a modulated component included in the light reflected at the output terminal of the Raman amplifier is detected to thereby confirm a connection state of the output terminal of the Raman amplifier without being affected by ambient light, and perform output control of the Raman pump light.

However, in the abovementioned conventional technology using the OSC, there is a problem in that if a length of the optical transmission line in one repeating section becomes long, connection confirmation by communication of the OSC becomes difficult.

This problem is explained in more detail. Generally, as an application of the Raman amplifier, long span Raman and long-haul Raman are known. The long span Raman is an application method for increasing the length of the transmission distance of one repeating section, in which a signal gain is provided by Raman amplification in the optical transmission line, so that a level of the signal light propagating on the optical transmission line and input to an optical transmission device on a downstream side exceeds a lower limit of an input level range of an erbium doped fiber amplifier (EDFA) provided inside the device. On the other hand, the long-haul Raman is an application method for increasing the number of repeaters (the number of spans) in a multi-stage repeating system, in which an input level of the signal light to the EDFA or the like is increased by Raman amplification in the optical transmission line, so that deterioration of an optical signal-to-noise ratio (OSNR) in the EDFA or the like at each repeating node is suppressed. In the case of the long-haul Raman, the power of the Raman pump light is optimized so that deterioration of the OSNR in the total optical amplification of the Raman amplifier and the EDFA is minimized.

Among the above applications of the Raman amplifier, in a system corresponding to the former long span Raman, if the transmission distance of one repeating section becomes long, transmission loss increases making it difficult to receive the OSC. Therefore it is necessary to take measures to Raman-amplify not only the signal light but also the OSC in the optical transmission line. In this case, since communication of the OSC is not confirmed without supply of the Raman pump light to the optical transmission line, the connection state between the output terminal of the Raman amplifier and the optical transmission line cannot be determined by using the OSC. In order to communicate the OSC without using the Raman amplification, the transmission power of the OSC needs to be increased or the OSC needs to be amplified on the reception side by an optical amplifying device other than the Raman amplifier. However this has a drawback in that, in a state with the Raman amplifier being activated in the normal operation, the device for increasing the reception power of the OSC is not required, and hence the cost therefor is an extra.

Moreover, in the optical output control of the Raman amplifier using the OSC, it is necessary to perform communication between an OSC unit in an existing system and a Raman amplifier unit to be added, at the time of upgrading an existing optical transmission system which does not use the Raman amplifier to a system which applies the Raman amplifier. Therefore, there is also a development problem in that initial design of the existing system must be performed on the assumption of expansion to the system which applies the Raman amplifier.

As for the aforementioned conventional technique for confirming the connection of the output terminal by applying modulation to the Raman pump light, for example, when the optical transmission line is cut at a position far from a receiving end (output terminal of the Raman amplifier), there is a possibility that high-level pump light may be output from the Raman amplifier, which is a problem. That is, in the conventional technique, basically the configuration is such that when the connection of the optical transmission line is disconnected, a modulated component of the reflected light that is reflected at the released end and returns to the Raman amplifier is detected, to thereby confirm the connection state of the optical transmission line, and control the optical output of the Raman amplifier. In this configuration, when the optical transmission line is cut at a position far from the receiving end, the reflected light on the cut surface is attenuated due to the transmission loss while the reflected light is returning to the receiving end, thereby making it difficult to detect the reflected light at the receiving end. Specifically, the power of Fresnel-reflected light at the cut surface becomes about −14 dB of the power of the light incident on the cut surface. If it is assumed that a distance from the cut surface to the receiving end is L [km], the output power of the modulated pump light is P [dBm], and a loss coefficient of the optical transmission line is $\alpha$ [dB/km], the power of the reflected light returning from the cut surface to the receiving end becomes P-14-2× L×$\alpha$ [dBm]. Assuming as above that the output power of the Raman pump light is set high so that the reflected light can be detected at the receiving end, the power already exceeds the safe level at the receiving end, and hence there is an inherent problem in using such pump light for confirming the connection of the optical transmission line.

In the case where reflected light from a cut surface cannot be detected at the receiving end, it is determined that the connection state of the optical transmission line is normal, and hence high-level pump light is output from the Raman amplifier. Assuming that the output power of the pump light at this time is Px, the power of the pump light output from the remote cut surface to the outside becomes Px-L×$\alpha$. Because the output power Px of the pump light is set to a very high level in order to obtain a desired Raman gain, the power exceeds the safe level even at a great distance.

In the above cited document (No. 2002-221743) is shown a configuration in which modulated backward Raman pump light is observed with a device on an upstream side, and the level of the modulated component is detected to thereby confirm the connection state of a connector on the downstream side, and output control of the signal light from the upstream side and of the forward Raman pump light is performed. However in this configuration it is not confirmed on the downstream side that the modulated component of the backward Raman pump light has been detected on the upstream side, and the output control of the Raman amplifier on the downstream side is performed basically by detecting the reflected light of the backward Raman pump light. Therefore, when the optical transmission line is cut at a great distance from the receiving end, as in the above case, high-level backward Raman pump light is output from the Raman amplifier on the downstream side.

SUMMARY

The present invention focuses attention on the above points, with an object of providing, in an optical transmission system using a Raman amplifier, a control technique capable of performing safe output control of the Raman pump light even if the transmission distance between nodes becomes long.

In order to achieve the above object, the optical transmission system includes a plurality of nodes on first and second transmission lines corresponding to an uplink and a downlink, with each node equipped with a Raman amplifying device for Raman-amplifying each main signal light transmitted on the first and second transmission lines. One aspect of the Raman amplifying device includes: a pump light generating section that generates backward Raman pump light for Raman-amplifying a main signal light transmitted on a first optical transmission line, and provides the backward Raman pump light to the first optical transmission line; a pump light modulating section that modulates the backward Raman pump light generated by the pump light generating section to thereby transmit a pilot signal for confirming a connection state of the first optical transmission line to an opposite node positioned on an upstream side of the first optical transmission line; a modulated-component detecting section that receives backward Raman pump light propagating on a second optical transmission line, and detects whether a modulated component corresponding to a response signal indicating that a pilot signal transmitted from an own node is received by an opposite node is included in the received backward Raman pump light; and a pump light controlling section that controls a power of the backward Raman pump light generated in the pump light generating section to a normal operation level when a modulated component corresponding to a response signal is detected by the modulated-component detecting section, and controls a power of the backward Raman pump light generated in the pump light generating section to a safe level when a modulated component corresponding to a response signal is not detected by the modulated-component detecting section.

Moreover, another aspect of the Raman amplifying device includes: a first pump light generating section that generates backward Raman pump light for Raman-amplifying a main signal light transmitted on a first optical transmission line and provides the backward Raman pump light to the first optical transmission line; a second pump light generating section that generates forward Raman pump light that has a wavelength different to that of the backward Raman pump light generated by the first pump light generating section, for Raman-amplifying a main signal light transmitted on a second optical transmission line, and provides the forward Raman pump light to the second optical transmission line; a first pump light modulating section that modulates the backward Raman pump light generated by the first pump light generating section to thereby transmit a pilot signal for confirming a connection state of the first optical transmission line to an opposite node positioned on an upstream side of the first optical transmission line; a first modulated-component detecting section that receives backward Raman pump light propagating on a second optical transmission line, and detects whether a modulated component corresponding to a pilot signal transmitted from an opposite node is included in the received backward Raman pump light; a second pump light modulating section that, when a modulated component corresponding to a pilot signal is detected by the first modulated-component detecting section, modulates the forward Raman pump light generated by the second pump light generating section, to thereby transmit a response signal indicating reception of a pilot signal to an opposite node; a second modulated-component detecting section that receives a forward Raman pump light propagating on a first optical transmission line, and detects whether a modulated component corresponding to a response signal transmitted from an opposite node is included in the received forward Raman pump light; and a pump light controlling section that controls a power of backward Raman pump light generated in the first pump light generating section to a normal operation level when a modulated component corresponding to the response signal is detected by the second modulated-component detecting section, and controls a power of backward Raman pump light generated in the first pump light generating section to a safe level when a modulated component corresponding to the response signal is not detected by the second modulated-component detecting section.

As described above, according to the optical transmission system, even when the transmission distance between adjacent nodes becomes long, and the conventional connection confirmation of the optical transmission line by communication of the OSC is difficult, the pilot signal and the response signal are transferred between the own node and the opposite node by modulating the backward Raman pump light or modulating both the backward Raman pump light and the forward Raman pump light. Therefore connection confirmation of the optical transmission line can be reliably performed, enabling output control of the Raman pump light to be performed safely.

Other objects, features, and advantages of the present invention will become apparent from the following description of embodiments, in conjunction with the appended drawings.

BRIEF DESCRIPTION OF THE DRAWINGS

FIG. 8 is a block diagram illustrating a configuration of a Raman amplifier in a third embodiment.

FIG. 9 is a diagram illustrating a modulation pattern of two pump light sources in the third embodiment.

DESCRIPTION OF EMBODIMENTS

Hereunder is a description of a best mode for carrying out the present invention, with reference to the accompanying drawings. Throughout the figures, the same reference symbols denote the same or corresponding parts.

Figure 1:
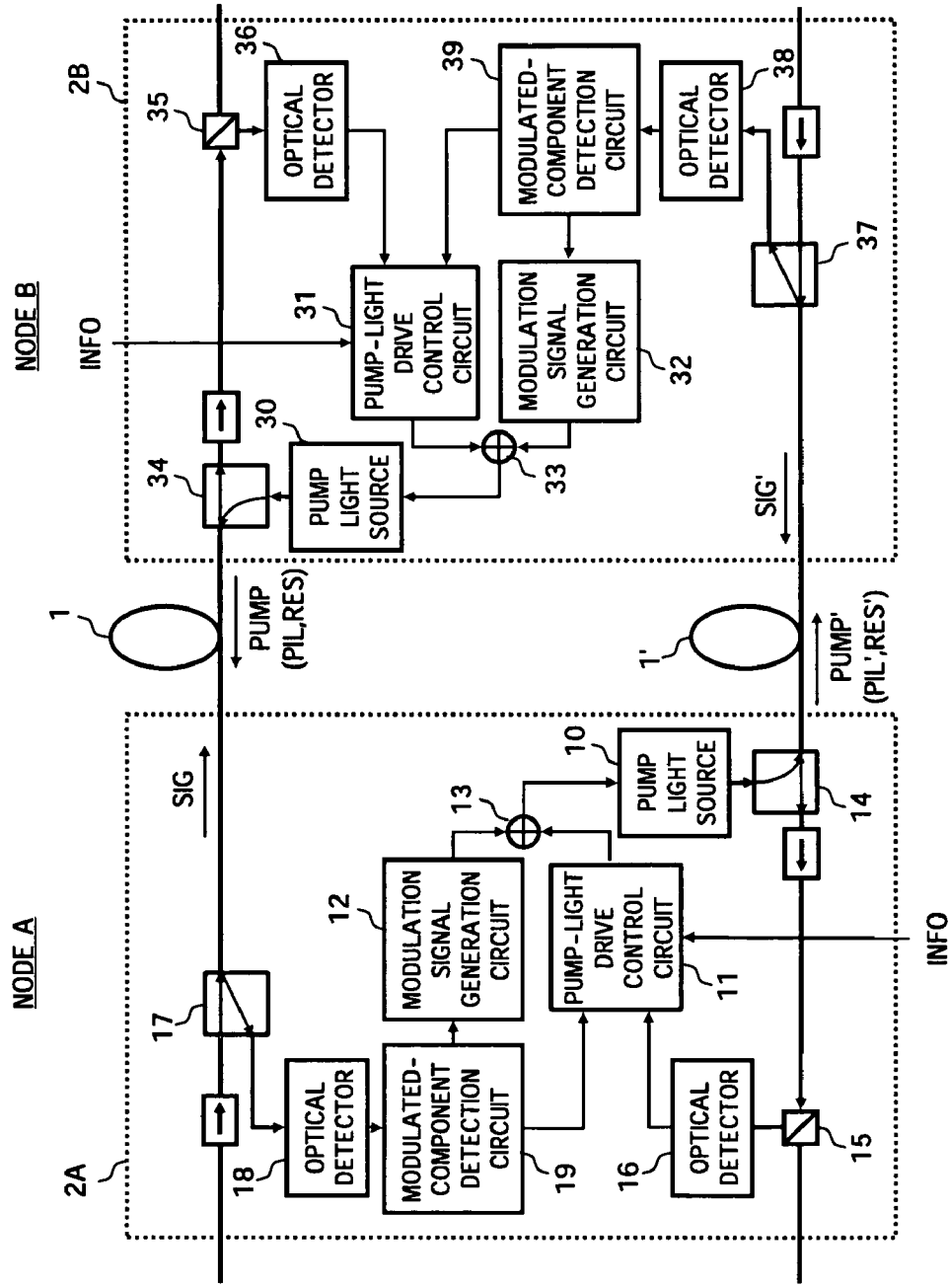
FIG. 1 is a block diagram illustrating a configuration of a main part in a first embodiment.

FIG. 1 is a block diagram illustrating a configuration of a main part in a first embodiment of the present invention.

In FIG. 1, an optical transmission system comprises nodes A and B on first and second transmission lines 1 and 1' corresponding to an uplink and a downlink, and Raman-amplifies a main signal light SIG transmitted from the node A using a backward Raman pump light PUMP output from a Raman amplifier 2B of the node B, and transmits this to the optical transmission line 1 on the uplink side, and Raman-amplifies a main signal light SIG' transmitted from the node B using a backward Raman pump light PUMP' output from a Raman amplifier 2A of the node A and transmits this to the optical transmission line 1' on the downlink side. At this time, required modulation is applied to the Raman pump lights PUMP and PUMP' output from the respective Raman amplifiers 2B and 2A, to thereby transmit pilot signals PIL and PIL' for confirming connection of the optical transmission lines 1 and 1', from the downstream side to the upstream side of each link. Then when the pilot signals PIL and PIL' are received on the upstream side, required modulation is applied to the Raman pump lights PUMP' and PUMP in the opposite link, to thereby transmit response signals RES' and RES from the downstream side to the upstream side of the opposite link. Then by receiving the response signals RES' and RES on the upstream side of the opposite link it is determined that the optical transmission lines 1 and 1' are connected normally, and output power of the Raman pump lights PUMP and PUMP' is controlled to a normal operation state.

Specifically, the Raman amplifier 2A of the node A comprises, for example: a pump light source 10 that generates the backward Raman pump light PUMP' on the downlink side and a pump-light drive control circuit 11 therefor; a modulation signal generation circuit 12 that generates modulation signals respectively corresponding to the pilot signal PIL' and the response signal RES'; a superposing circuit 13 that superposes the modulation signals from the modulation signal generation circuit 12 on a drive signal from the pump-light drive control circuit 11; a multiplexer 14 that provides the Raman pump light PUMP' generated by the pump light source 10 onto the optical transmission line 1' on the downlink side; a branching coupler 15 and an optical detector 16 for monitoring the level of the main signal light SIG' transmitted on the optical transmission line 1'; a branching filter 17 and an optical detector 18 for monitoring the Raman pump light PUMP propagating on the optical transmission line 1 on the uplink side in a direction opposite to the main signal light SIG; and a modulated-component detection circuit 19 that detects a modulated component from an output signal of the optical detector 18.

Moreover, the Raman amplifier 2B of the node B comprises: a pump light source 30 that generates the backward Raman pump light PUMP on the uplink side and a pump-light drive control circuit 31 therefor; a modulation signal generation circuit 32 that generates modulation signals respectively corresponding to the pilot signal PIL and the response signal RES; a superposing circuit 33 that superposes the modulation signals from the modulation signal generation circuit 32 on a drive signal from the pump-light drive control circuit 31; a multiplexer 34 that provides the Raman pump light PUMP generated by the pump light source 30 onto the optical transmission line 1 on the uplink side; a branching coupler 35 and an optical detector 36 for monitoring the level of the main signal light SIG transmitted on the optical transmission line 1; a branching filter 37 and an optical detector 38 for monitoring the Raman pump light PUMP' propagating on the optical transmission line 1' on the downlink side in a direction opposite to the main signal light SIG'; and a modulated-component detection circuit 39 that detects a modulated component from an output signal of the optical detector 38.

Here, the pump light sources 10 and 30, the pump-light drive control circuits 11 and 31, and the multiplexers 14 and 34 function as pump light generating sections. Moreover, the pump-light drive control circuits 11 and 31 also have a function as pump light controlling sections. Furthermore, the modulation signal generation circuits 12 and 32, and the superposing circuits 13 and 33 function as pump light modulating sections. In addition, the branching filters 17 and 37, the optical detectors 18 and 38, and the modulated-component detection circuits 19 and 39 function as modulated-component detecting sections.

The pump light sources 10 and 30 each have at least one pump light source. The wavelength and the number of pump light sources are preset so that a Raman gain band including a wavelength band of the main signal lights SIG and SIG' can be obtained. The pump-light drive control circuits 11 and 31 generate drive signals for the pump light sources 10 and 30, and control the drive signals so that the levels of the main signal lights SIG and SIG' detected by the optical detectors 16 and 36 are within a predetermined range indicated by external setting information INFO described later at the time of normal operation (automatic level control: ALC). Moreover at the time of connection confirmation, the pump-light drive control circuits 11 and 31 have a function of changing the driven state of the pump light sources 10 and 30 according to detection results obtained by the modulated-component detection circuits 19 and 39 of the optical transmission lines, and performing safety control of the Raman pump lights PUMP and PUMP'.

Here, the control at the time of normal operation in the pump-light drive control circuits 11 and 31 is ALC. However automatic gain control (AGC) for controlling such that the Raman gain of the main signal lights SIG and SIG' becomes a required target value can be applied.

The modulation signal generation circuits 12 and 32, at the time of connection confirmation of the optical transmission line, generate a first modulation signal for modulating the intensity of the Raman pump lights PUMP' and PUMP with a preset frequency f1 and transmitting the pilot signals PIL' and PIL to the downstream side. Moreover, when the modulated component corresponding to the first modulation signal is detected by the modulated-component detection circuits 19 and 39 and reception of the pilot signals PIL and PIL' on the opposite link side is confirmed, the modulation signal generation circuits 12 and 32 generate a second modulation signal for modulating the intensity of the Raman pump lights PUMP' and PUMP with a frequency f2 different to the frequency f1 and transmitting the response signals RES' and RES to the downstream side.

The superposing circuits 13 and 33 superpose the first or second modulation signals output from the modulation signal generation circuits 12 and 32 on the drive signals output from the pump-light drive control circuits 11 and 31 to the pump light sources 10 and 30. The multiplexers 14 and 34 send the Raman pump lights PUMP' and PUMP output from the pump light sources 10 and 30 onto the optical transmission lines 1' and 1, and transmit the main signal lights SIG' and SIG transmitted on the optical transmission lines 1' and 1 and send the main signal lights SIG' and SIG to the branching couplers 15 and 35 on a subsequent stage. An optical isolator can be appropriately provided on a subsequent stage of a main signal light output port of the multiplexers 14 and 34.

The branching couplers 15 and 35 branch a part of the main signal lights SIG' and SIG that have passed through the multiplexers 14 and 34, and provide the branched light to the optical detectors 16 and 36. The optical detectors 16 and 36 respectively photoelectrically convert the branched lights from the branching couplers 15 and 35, and outputs these to the pump-light drive control circuits 11 and 31. The pump-light drive control circuits 11 and 31 determine a reception level of the main signal lights SIG' and SIG based on electric signals output from the optical detectors 16 and 36.

The branching filters 17 and 37 pass the main signal lights SIG and SIG' and send these to the optical transmission lines 1 and 1', and extract the Raman pump lights PUMP and PUMP' that have propagated through the optical transmission lines 1 and 1' in a direction opposite to the main signal lights SIG and SIG' and reached the node on the upstream side, and provide these to the optical detectors 18 and 38. The optical isolators can be appropriately provided on previous stages of main signal light input ports of the branching filters 17 and 37. The optical detectors 18 and 38 respectively photoelectrically convert the Raman pump light PUMP and PUMP' extracted by the branching filters 17 and 37 and output these to the modulated-component detection circuits 19 and 39. The modulated-component detection circuits 19 and 39 detect whether a modulated component of the frequency f1 or f2 is included in the electric signals output from the optical detectors 18 and 38, and send the detection result to the modulation signal generation circuits 12 and 32 and the pump-light drive control circuits 11 and 31, respectively.

Next is a description of the operation of connection confirmation of the optical transmission lines 1 and 1', and output control of the Raman pump light, in the first embodiment.

In the optical transmission system having the above configuration, connection confirmation of the optical transmission lines 1 and 1' for safely activating the Raman amplifiers 2A and 2B at each node A and B, that is, confirmation of the connection state, such as whether the output terminals of the Raman amplifiers 2A and 2B and the optical transmission lines 1' and 1 are correctly connected to each other, and the optical transmission line 1' and 1 are not cut along the way, is performed according to the reception state of the pilot signals PIL and PIL' and the response signals RES and RES' transferred between the respective nodes A and B by intensity modulation of the Raman pump lights PUMP and PUMP'.

Figure 2:
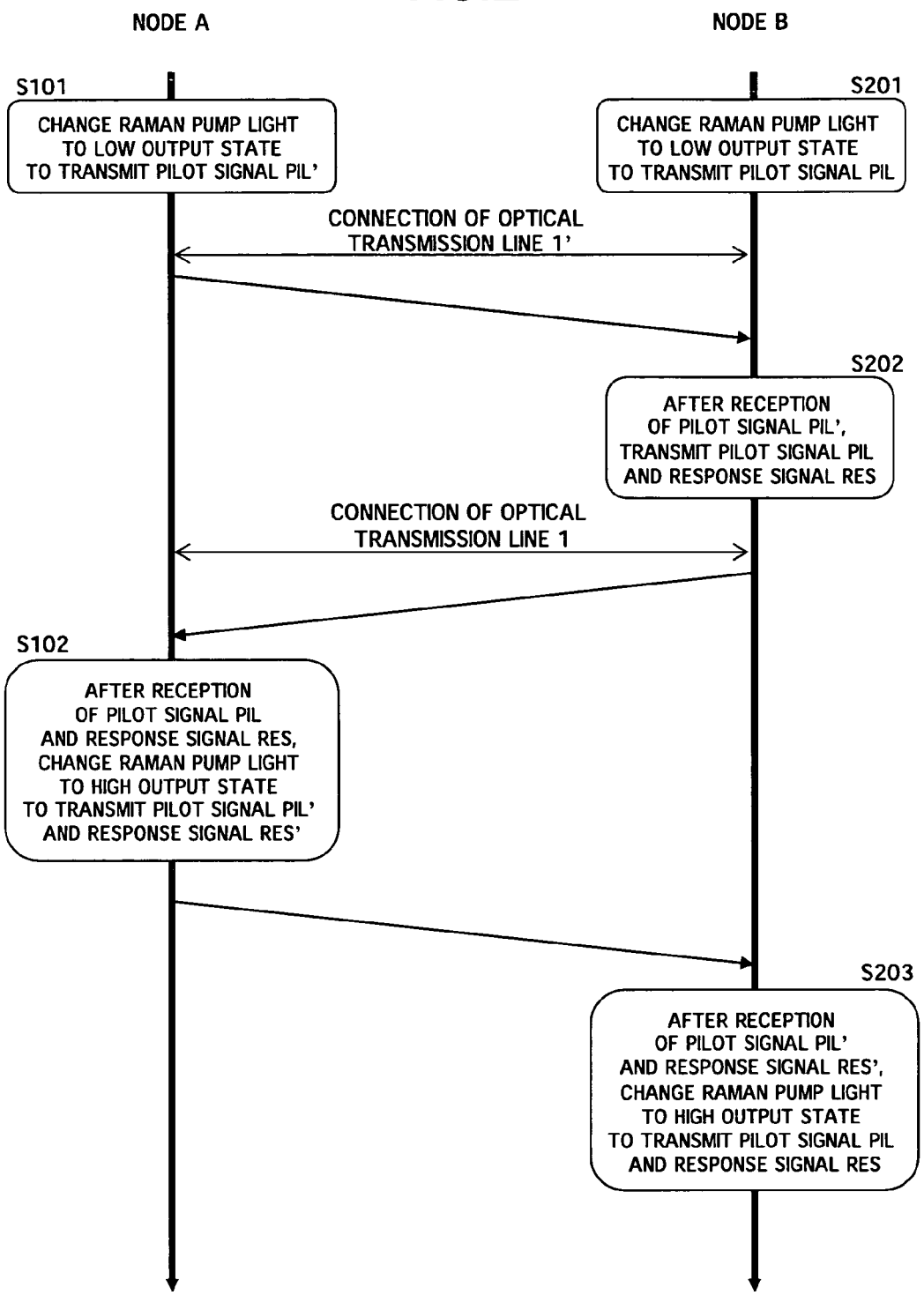
FIG. 2 is a flowchart illustrating one example of a connection confirmation procedure in the first embodiment.

FIG. 2 is a flowchart illustrating one example of a specific procedure of the connection confirmation between the nodes A and B. In the example of FIG. 2, at first in a state such as at the time of system startup, where the connection state between the nodes A and B has not been confirmed, before starting the operation of the main signal lights SIG and SIG', the driven state of the pump light sources 10 and 30 is initialized so that the output states of the pump lights from the Raman amplifiers 2A and 2B satisfy a safe level that does not harm a human body, and become a level that is detectable by the optical detectors 18 and 38 on the upstream side. Moreover at the same time, the modulation signal generation circuits 12 and 32 generate a modulation signal of the frequency f1, and the intensity of the Raman pump lights PUMP' and PUMP is modulated according to the modulation signal, to thereby transmit the pilot signals PIL' and PIL to the optical transmission lines 1' and 1 (S101, S201 in FIG. 2).

Then when the optical transmission line 1' on the downlink side is connected between the nodes A and B, the Raman pump light PUMP' output from the Raman amplifier 2A and that has propagated through the optical transmission line 1' is received by the optical detector 38 via the branching filter 37 in the Raman amplifier 2B. The output signal of the optical detector 38 is provided to the modulated-component detection circuit 39, where it is detected that a modulated component of frequency f1 is included in the electric signal, and the detection result is transmitted to the modulation signal generation circuit 32. In the modulation signal generation circuit 32, because the modulated component of frequency f1 is detected in the modulated-component detection circuit 39, reception of the pilot signal PIL' from the node A is confirmed, and a modulation signal of frequency f2 is generated in addition to the modulation signal of frequency f1. As a result, the intensity of the Raman pump light PUMP is modulated with the frequencies f1 and f2, and the pilot signal PIL and the response signal RES are transmitted to the optical transmission line 1 (S202 in FIG. 2).

Subsequently, when the optical transmission line 1 on the uplink side is connected between the nodes A and B, the Raman pump light PUMP output from the Raman amplifier 2B and that has propagated through the optical transmission line 1 is received by the optical detector 18 via the branching filter 17 in the Raman amplifier 2A. The output signal of the optical detector 18 is provided to the modulated-component detection circuit 19, where it is detected that modulated components of frequencies f1 and f2 are included in the electric signal, and the detection result is transmitted to the modulation signal generation circuit 12 and the pump-light drive control circuit 11. In the modulation signal generation circuit 12, because the modulated component of frequency f1 is detected in the modulated-component detection circuit 19, reception of the pilot signal PIL from the node B is confirmed, and a modulation signal of frequency f2 is generated in addition to the modulation signal of frequency f1. Moreover, in the pump-light drive control circuit 11, because the modulated component of frequency f2 is detected in the modulated-component detection circuit 19, reception of the response signal RES from the node B is confirmed, and the driven state of the pump light source 10 is changed over to a high output state for at the time of normal operation. As a result the Raman pump light PUMP' in the high output state, that has been intensity modulated with the frequencies f1 and f2, is generated by the pump light source 10, and the pilot signal PIL' and the response signal RES' are transmitted to the optical transmission line 1' (S102 in FIG. 2).

When the Raman pump light PUMP' in the high output state, that has been intensity modulated with the frequencies f1 and f2, propagates through the optical transmission line 1' and is received by the optical detector 38 in the Raman amplifier 2B, it is detected by the modulated-component detection circuit 39 that modulated components of frequencies f1 and f2 are included in the output signal of the optical detector 38, and the detection result is transmitted to the modulation signal generation circuit 32 and the pump-light drive control circuit 31. Upon reception of the detection result by the modulated-component detection circuit 39, the modulation signal generation circuit 32 continuously generates modulation signals of frequencies f1 and f2. Moreover, in the pump-light drive control circuit 31, because the modulated component of frequency f2 is detected in the modulated-component detection circuit 39, reception of the response signal RES' from the node A side is confirmed, and the driven state of the pump light source 30 is changed over to a high output state for at the time of normal operation. As a result the Raman pump light PUMP in the high output state, that has been the intensity modulated with the frequencies f1 and f2, is generated by the pump light source 30, and provided to the optical transmission line 1 (S203 in FIG. 2). Hereinafter, the normal operation of the main signal lights SIG and SIG' is performed, while monitoring the reception state of the pilot signals PIL and PIL' at each node A and B, and when either one of the pilot signals PIL and PIL' is not received, the Raman pump light is changed over to a low output state, to thereby ensure safety.

In the first embodiment, even after the Raman pump light is changed over from the low output state to the high output state, transmission of the pilot signal and the response signal is continued by modulating the intensity of the Raman pump light with the frequencies f1 and f2. Therefore, the Raman gain with respect to the main signal lights SIG and SIG' changes according to the frequencies f1 and f2, and the intensity of the main signal lights change, so that there is the possibility of deterioration in the transmission characteristics. In order to avoid this, it is desired to set the modulation frequencies f1 and f2 for the Raman pump light to a sufficiently high level.

Figure 3:
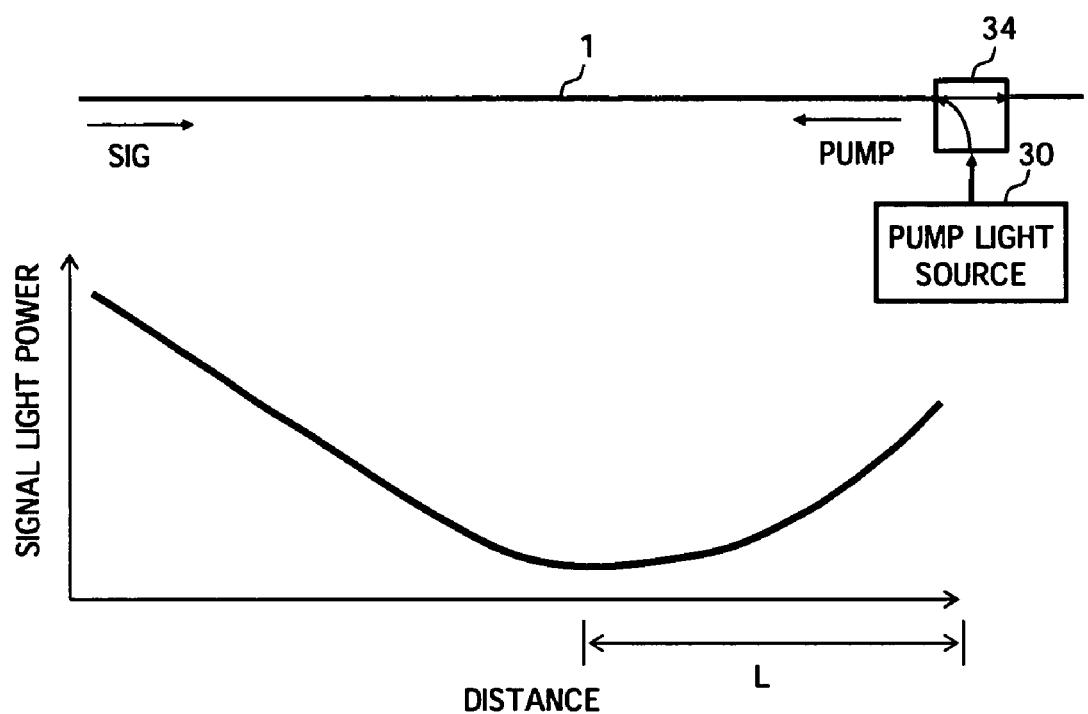
FIG. 3 is a diagram for explaining a modulation frequency of Raman pump light in the first embodiment.

Here, the desired modulation frequency for the Raman pump light will be described in detail. The Raman gain is proportional to the product of the power of the Raman pump light and the power of the main signal light. In the case of backward pumping in which the Raman pump light is provided from the downstream side of the optical transmission line, the power of the Raman pump light attenuates as a consequence of propagating on the optical transmission line, and at the same time, a power drop equivalent to the energy provided to the main signal light occurs. Therefore, the Raman gain with respect to the main signal light obtained by the backward Raman pump light rapidly decreases, for example, as illustrated in FIG. 3, accompanying progress of the Raman pump light PUMP on the optical transmission line 1 toward the upstream side. Accordingly, it is in a range of distance L from the receiving end of the optical transmission line (input end of the Raman pump light) that the Raman gain can be effectively obtained. At this time, if the propagation speed of the Raman pump light is assumed to be Vg, the time while the Raman pump light input to the optical transmission line at a certain moment contributes to amplification of the main signal light becomes L/Vg. Therefore, because the main signal light proceeds in an opposite direction with respect to the Raman pump light, by modulating the Raman pump light in a sufficiently earlier period than Vg/L, the Raman gain with respect to the main signal light is averaged at an arbitrary position within the range of the distance L, thereby enabling suppression of the fluctuation of the intensity of the main signal light.

In the optical transmission system, a repeating distance between the nodes A and B increases according to the above series of procedures as illustrated in FIG. 2, and even when it is difficult to confirm the connection of the optical transmission line by communication of the OSC as in the conventional technology, connection between the output terminal of the Raman amplifiers 2A and 2B and the optical transmission lines 1' and 1 can be reliably confirmed by transferring the pilot signal and the response signal between the nodes A and B by intensity modulation of the Raman pump light. Moreover, abnormality in the connection state due to disconnection or the like at an arbitrary position on the optical transmission lines 1 and 1' can be reliably detected. Accordingly, the Raman amplifiers 2A and 2B can be activated safely.

In the first embodiment, an example in which the pilot signal and the response signal are transmitted by performing intensity modulation of the Raman pump light with specific frequencies f1 and f2 has been described. However, the modulation method of the Raman pump light in the present invention is not limited thereto, and for example it is also possible to transmit the pilot signal and the response signal by applying modulation to the Raman pump light using a specific code.

Next is a description of a second embodiment of the present invention.

In the first embodiment, even after connection confirmation of the optical transmission line is complete and the Raman pump light is changed over to the high output state, transmission of the pilot signal by modulation of the Raman pump light is continued so as to monitor the reception state thereof. On the other hand, in the second embodiment an application example is described where, because after the Raman pump light is changed over to the high output state, communication of the OSC becomes possible, this is used to monitor the connection state of the optical transmission line.

Figure 4:
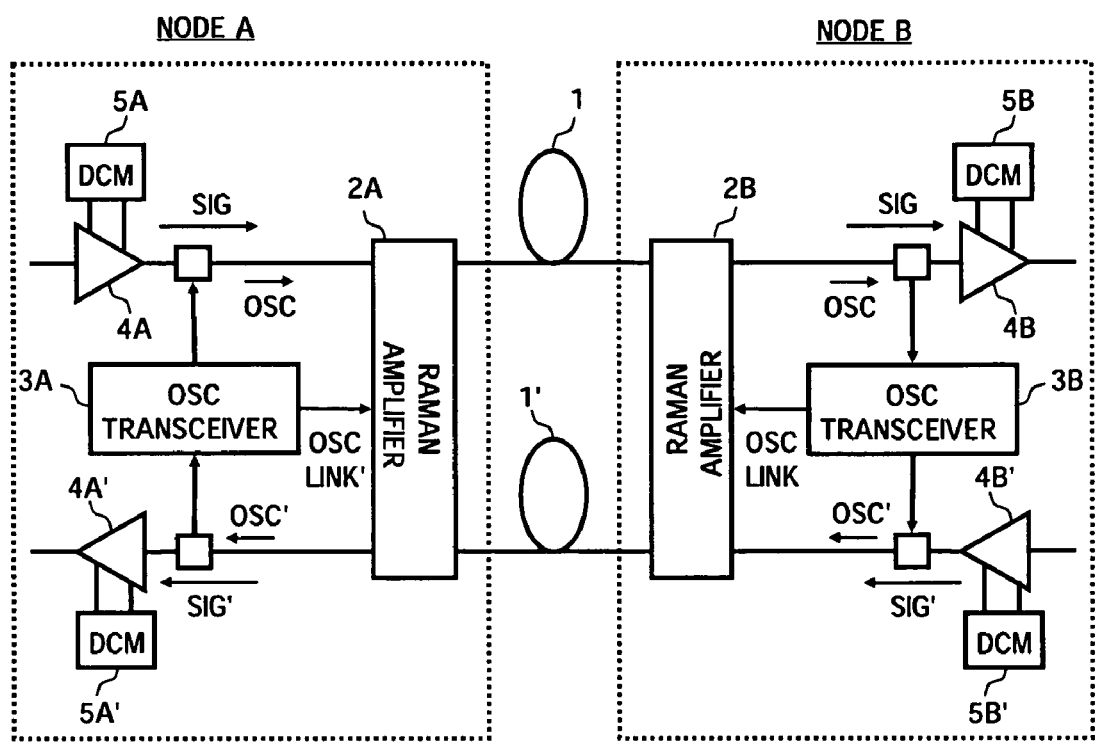
FIG. 4 is a block diagram illustrating a configuration of a main part in a second embodiment.

FIG. 4 is a block diagram illustrating a configuration of the main part in a second embodiment of an optical transmission system of the embodiment.

In FIG. 4, the optical transmission system is provided with, in addition to the Raman amplifiers 2A and 2B the same as those in the first embodiment, OSC transceivers 3A and 3B for transmitting and receiving the OSC propagating on the optical transmission lines 1 and 1' in the same direction as the main signal lights SIG and SIG'. The OSC transceiver 3A of the node A generates an OSC having a different wavelength to that of the main signal light SIG, multiplexes the OSC with the main signal light SIG on an optical path between a main signal optical amplifier 4A and the Raman amplifier 2A, and transmits this to the optical transmission line 1 on the uplink side. Moreover, the OSC transceiver 3A extracts the OSC' transmitted on the optical transmission line 1' on the downlink side from a previous stage of a main signal optical amplifier 4A' and performs reception processing, and outputs a signal OSCLINK' indicating reception of the OSC' to the Raman amplifier 2A.

The OSC transceiver 3B of the node B generates an OSC' having a different wavelength to that of the main signal light SIG', multiplexes the OSC' with the main signal light SIG' on an optical path between a main signal optical amplifier 4B' and the Raman amplifier 2B, and transmits this to the optical transmission line 1' on the downlink side. Moreover, the OSC transceiver 3B extracts the OSC transmitted on the optical transmission line 1 on the uplink side from a previous stage of a main signal optical amplifier 4B and performs reception processing, and outputs a signal OSCLINK indicating reception of the OSC to the Raman amplifier 2B.

The second embodiment is one where the wavelengths of the Raman pump lights PUMP and PUMP' are set so that not only the main signal lights SIG and SIG' but also the OSC and OSC' are Raman-amplified by the Raman pump lights PUMP and PUMP' provided from the Raman amplifiers 2B and 2A to the optical transmission lines 1 and 1'. Moreover to the respective main signal optical amplifiers 4A, 4A' and 4B, 4B' are respectively connected to dispersion-compensating modules (DCM) 5A, 5A' and 5B, 5B' for compensating the wavelength dispersion of the main signal lights SIG and SIG'.

Figure 5:
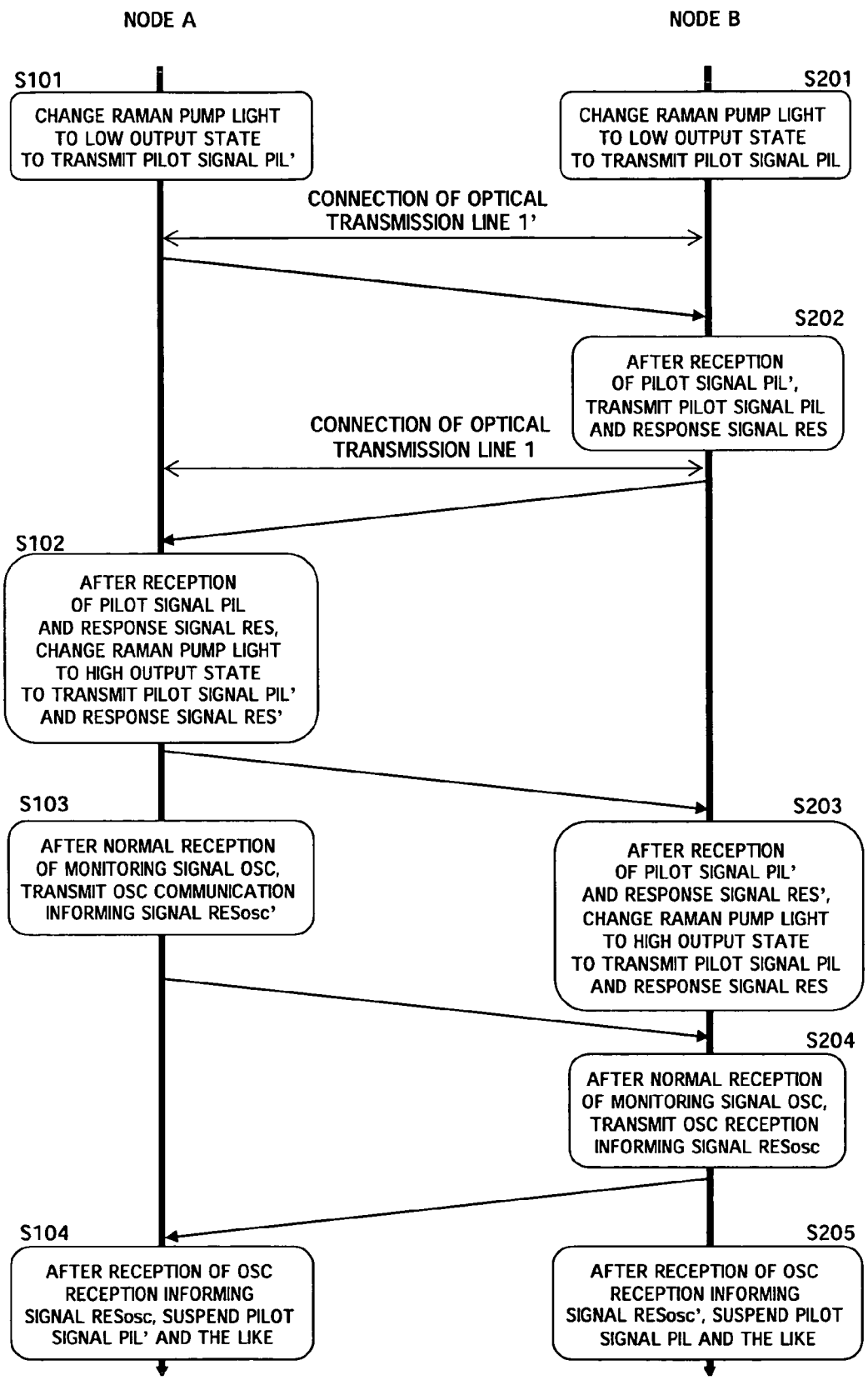
FIG. 5 is a flowchart illustrating one example of a connection confirmation procedure in the second embodiment.

In the optical transmission system having the above configuration, for example as illustrated in the flowchart in FIG. 5, processing in S101, S102 and S201 to S203 the same as that in the first embodiment illustrated in FIG. 2 is performed at the time of confirming the connection between nodes A and B. In a state where connection confirmation of the optical transmission lines 1' and 1 is complete and the Raman pump lights PUMP and PUMP' are changed over to the high output state, and transmission of the pilot signals PIL and PIL' and the response signals RES and RES' is continued, then for example, the OSC' transmitted from the node B to the optical transmission line 1' is Raman-amplified by the Raman pump light PUMP' from the Raman amplifier 2A, so that the OSC' can be received by the OSC transceiver 3A inside the node A. As a result the signal OSCLINK' indicating reception of the OSC' on the downlink side is output from the OSC transceiver 3A to the Raman amplifier 2A. In the Raman amplifier 2A, upon reception of the OSC', the modulation signal generation circuit 12 generates a modulation signal of a frequency f3 different to the frequencies f1 and f2, and the intensity of the Raman pump light PUMP' is modulated with the frequency f3, so that an OSC communication informing signal RESosc' is transmitted to the optical transmission line 1' (S103 in FIG. 5).

Moreover, since the OSC transmitted from the node A to the optical transmission line 1 is Raman-amplified by the Raman pump light PUMP from the Raman amplifier 2B, it can be received by the OSC transceiver 3B inside the node B. As a result the signal OSCLINK indicating reception of the OSC on the uplink side is output from the OSC transceiver 3B to the Raman amplifier 2B. In the Raman amplifier 2B, upon reception of the OSC, the modulation signal generation circuit 32 generates a modulation signal of a frequency f3 different to the frequencies f1 and f2, and the intensity of the Raman pump light PUMP is modulated with the frequency f3, so that an OSC communication informing signal RESosc is transmitted to the optical transmission line 1 (S204 in FIG. 5).

Then when the Raman pump lights PUMP and PUMP' that have been intensity modulated with the frequencies f1 to f3 propagate on the optical transmission lines 1 and 1' and are respectively received by the optical detectors 18 and 38 of the Raman amplifiers 2A and 2B, it is detected in the modulated-component detection circuits 19 and 39 that a modulated component of the frequency f3 is included in the output signals of the optical detectors 18 and 38, and the detection results are transmitted to the modulation signal generation circuits 12 and 32. In the modulation signal generation circuits 12 and 32, upon reception of the detection results obtained by the modulated-component detection circuits 19 and 39, output of the modulation signals of frequencies f1 to f3 is respectively suspended (S104, S205 in FIG. 5). Hereinafter, normal operation of the main signal lights SIG and SIG' is performed, while monitoring the reception states of the OSC and OSC' at each node A and B, and when either one of the OSC and OSC' is not received, the Raman pump lights PUMP and PUMP' are changed over to the low output state, and the pilot signals PIL and PIL' with the intensities modulated with the frequency f1 are transmitted, and connection confirmation of the optical transmission lines 1 and 1' is performed again.

According to the optical transmission system described above, since the connection state between the nodes A and B is monitored by using the OSC and OSC' in the normal operation state, then even if the modulation frequencies f1 to f3 of the Raman pump light are set to be low, the main signal lights SIG and SIG' can be Raman-amplified stably.

Next is a description of a third embodiment of the present invention.

Figure 6:
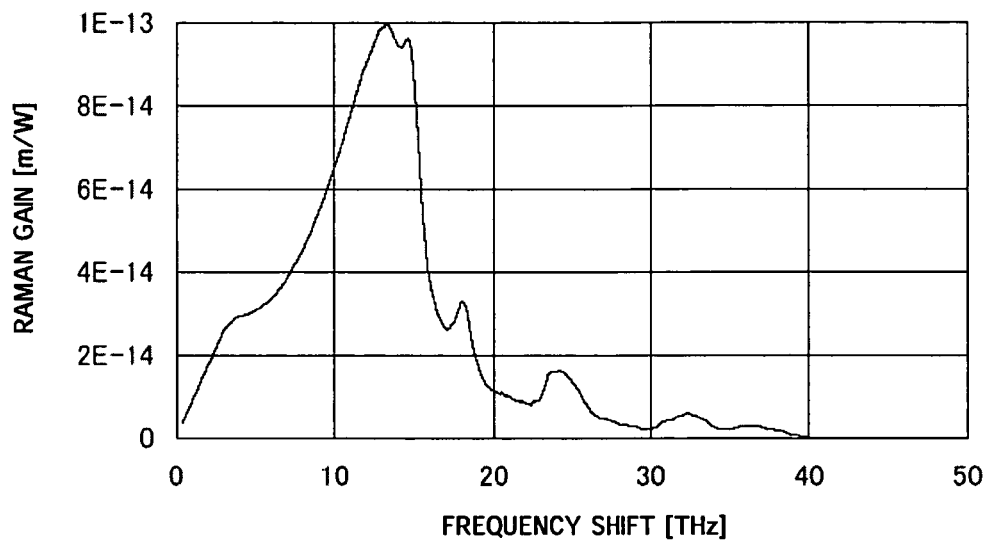
FIG. 6 is a diagram illustrating frequency (wavelength) dependence of Raman gain.
Figure 7:
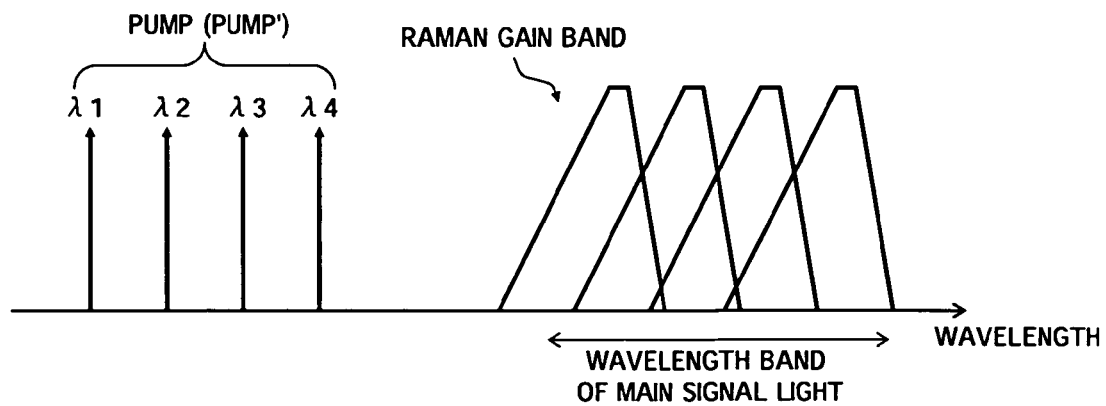
FIG. 7 is a diagram in which the wavelength dependence of the Raman gain is flattened by combing a plurality of Raman pump lights.

In the Raman amplifier, for example, as illustrated in FIG. 6, the dependency with respect to the frequency (wavelength) of the Raman gain obtained by pump light of one wavelength is remarkable. Therefore, designing is often performed so that the wavelength dependence of the Raman gain in an optical band of the main signal is flattened, as illustrated in FIG. 7, by combining a plurality of Raman pump lights having different wavelengths. Therefore in the third embodiment, an application example is described in which fluctuation of the intensity of the main signal light due to modulation of the Raman pump light is suppressed by selectively modulating Raman pump lights having adjacent wavelengths, among the plurality of Raman pump lights, to transmit the pilot signal and the response signal.

FIG. 8 is a block diagram illustrating a configuration of a Raman amplifier in the third embodiment of the optical transmission system.

In the optical transmission system in FIG. 8, as a specific configuration of the aforementioned Raman amplifier 2A of the node A in the first embodiment, the pump light source 10 has a plurality of (here for example, four) pump light sources 101-1, 101-2, 101-3, and 101-4, a multiplexer (MUX) 102, a coefficient setting circuit 103, and multiplier circuits 104-1, 104-2, 104-3, and 104-4. Moreover the superposing circuit 13 has an inverter circuit 131, multiplier circuits 132-1 and 132-

2, and adder circuits 133-1 and 133-2. The configuration of other parts other than of the Raman amplifier 2A is basically the same as in the first embodiment. Furthermore it is assumed that the Raman amplifier at another node in the optical transmission system has the same configuration as that of the Raman amplifier 2A of the node A.

The pump light sources 101-1 to 101-4 generate pump light having wavelengths λ1 to λ4 different to each other. The wavelengths λ1 to λ4 are set corresponding to a wavelength band of the main signal light, and it is assumed here that λ1, λ2, λ3 and λ4 are allocated sequentially from a short wavelength side. The multiplexer 102 multiplexes the pump lights output from each of the pump light sources 101-1 to 101-4 and outputs the multiplexed pump light. The output light from the multiplexer 102 corresponds to the Raman pump light PUMP' in the first embodiment, and is transmitted to the optical transmission line 1' on the downlink side via the multiplexer 14.

The coefficient setting circuit 103 is a circuit for optimizing a power ratio of respective pump lights output from the respective pump light sources 101-1 to 101-4, so that the wavelength dependence of the Raman gain in the wavelength band of the main signal light is decreased, and outputs a coefficient signal according to the ratio to each of the pump light sources 101-1 to 101-4. The multiplier circuits 104-1 to 104-4 respectively generate a drive signal corresponding to the pump light power ratio by multiplying the drive signal provided from the pump-light drive contro circuit 11 to the respective pump light sources 101-1 to 101-4 by the coefficient signal from the coefficient setting circuit 103. The total power of the pump lights output from the pump light sources 101-1 to 101-4 is adjusted according to the ALC in the pump-light drive control circuit 11.

The inverter circuit 131 generates a signal in which a phase of the modulation signal output from the modulation signal generation circuit 12 is inverted, and outputs the inverted signal to the multiplier circuit 132-1. The multiplier circuit 132-1 multiplies the output signal from the inverter circuit 131 by the coefficient signal corresponding to the pump light source 101-1 output from the coefficient setting circuit 103. The multiplier circuit 132-2 multiplies the modulation signal (modulation signal for which the phase has not been inverted by the inverter circuit 131) output from the modulation signal generation circuit 12 by the coefficient signal corresponding to the pump light source 101-2 output from the coefficient setting circuit 103. By combination of the inverter circuit 131 and the multiplier circuits 132-1 and 132-2, a modulation signal having a complementary relationship, and which has been subjected to weighting corresponding to the power ratio of the pump light, is generated. The adder circuits 133-1 and 133-2 respectively superpose the modulation signals output from the multiplier circuits 132-1 and 132-2 on the drive signals provided from the pump-light drive control circuit 11 to the pump light sources 101-1 and 101-2. The drive signals superposed with the modulation signals in the adder circuits 133-1 and 133-2 are respectively provided to the multiplier circuits 104-1 and 104-2.

In the Raman amplifier 2A having the above-described configuration, out of the four Raman pump lights having different wavelengths to each other, two pump lights having adjacent wavelengths are selected, and intensity modulation is applied in a complementary manner to each of the Raman pump lights. As a result, the pilot signal PIL' and the response signal RES' for connection confirmation of the optical transmission line are transmitted to the optical transmission line 1'. Specifically, here two pump light sources 101-1 and 101-2 on the short wavelength side are selected as modulation targets, and driven according to a modulation pattern as illustrated in FIG. 9. That is to say, modulation is performed so that the power of each of a pair of Raman pump lights having the adjacent wavelengths on the short wavelength side alternately increases or decreases.

As a result, fluctuations of the Raman gain with respect to the main signal light SIG' attributable to the intensity modulation with the frequencies f1 and f2 at the time of transmitting the pilot signal PIL' or the response signal RES' are suppressed. Particularly, the influence of the modulation of the Raman pump light on the intensity of the main signal light SIG' can be effectively reduced by selecting the Raman pump light on the short wavelength side as the modulation target. That is to say, the Raman gain band obtained by the pump lights of wavelengths λ1 to λ4 has a shape as illustrated in FIG. 7, such that respective wavelength channels of the main signal light (wavelength multiplexed signal light) are arranged substantially uniformly in a range in which relatively flat Raman gain is realized. Therefore, the number of wavelength channels of the main signal light affected by the modulation can be decreased in the case of applying modulation to the Raman pump light on the short wavelength side, as compared to the case of applying modulation to the Raman pump light on the long wavelength side.

Therefore, according to the optical transmission system in which the Raman amplifier 2A described above is provided in each node, even after connection confirmation of the optical transmission line between respective nodes is complete and the operation of the main signal light is started with the Raman pump light being set to the high output state, the connection state of the optical transmission line can be monitored by using the pilot signal obtained by the modulation of the Raman pump light, without substantially affecting the Raman amplification of the main signal light.

In the third embodiment, a configuration example is shown for when the number of wavelengths of the Raman pump light is four. However, for example when two Raman pump lights having different wavelengths are used, the influence of modulation on the intensity of the main signal light can be reduced by modulating the respective Raman pump lights in a complementary manner. Moreover the same configuration as that of the third embodiment is also effective for a case in which three or five or more Raman pump lights are used.

Next is a description of a fourth embodiment of the present invention.

In the fourth embodiment, an application example is shown in which the forward Raman pump light is used in common with respect to the third embodiment.

Figure 10:
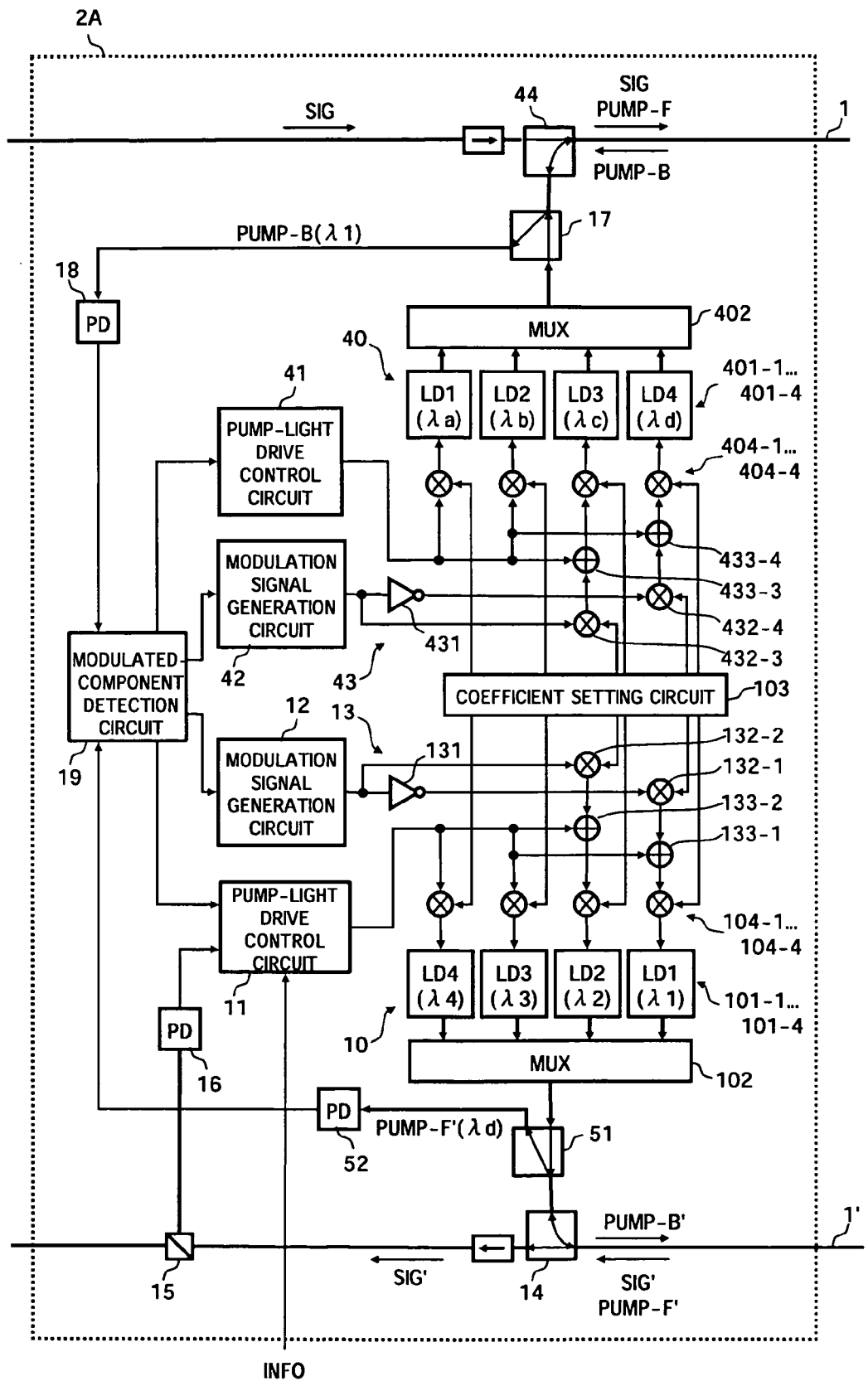
FIG. 10 is a block diagram illustrating a configuration of a Raman amplifier in a fourth embodiment.

FIG. 10 is a block diagram illustrating a configuration of a Raman amplifier in a fourth embodiment of the optical transmission system.

In the optical transmission system in FIG. 10, for the Raman amplifier 2A of the node A in the aforementioned third embodiment, as a configuration for providing a forward Raman pump light PUMP-F to the optical transmission line 1 on the uplink side, there is provided: a pump light source 40, a pump-light drive control circuit 41, a modulation signal generation circuit 42, a superposing circuit 43, and a multiplexer 44. Moreover, as a configuration for detecting the modulated component from the forward Raman pump light PUMP-F' that has propagated on the optical transmission line 1' on the downlink side and reached the node A, there is provided a branching filter 51 and an optical detector 52.

Figure 11:
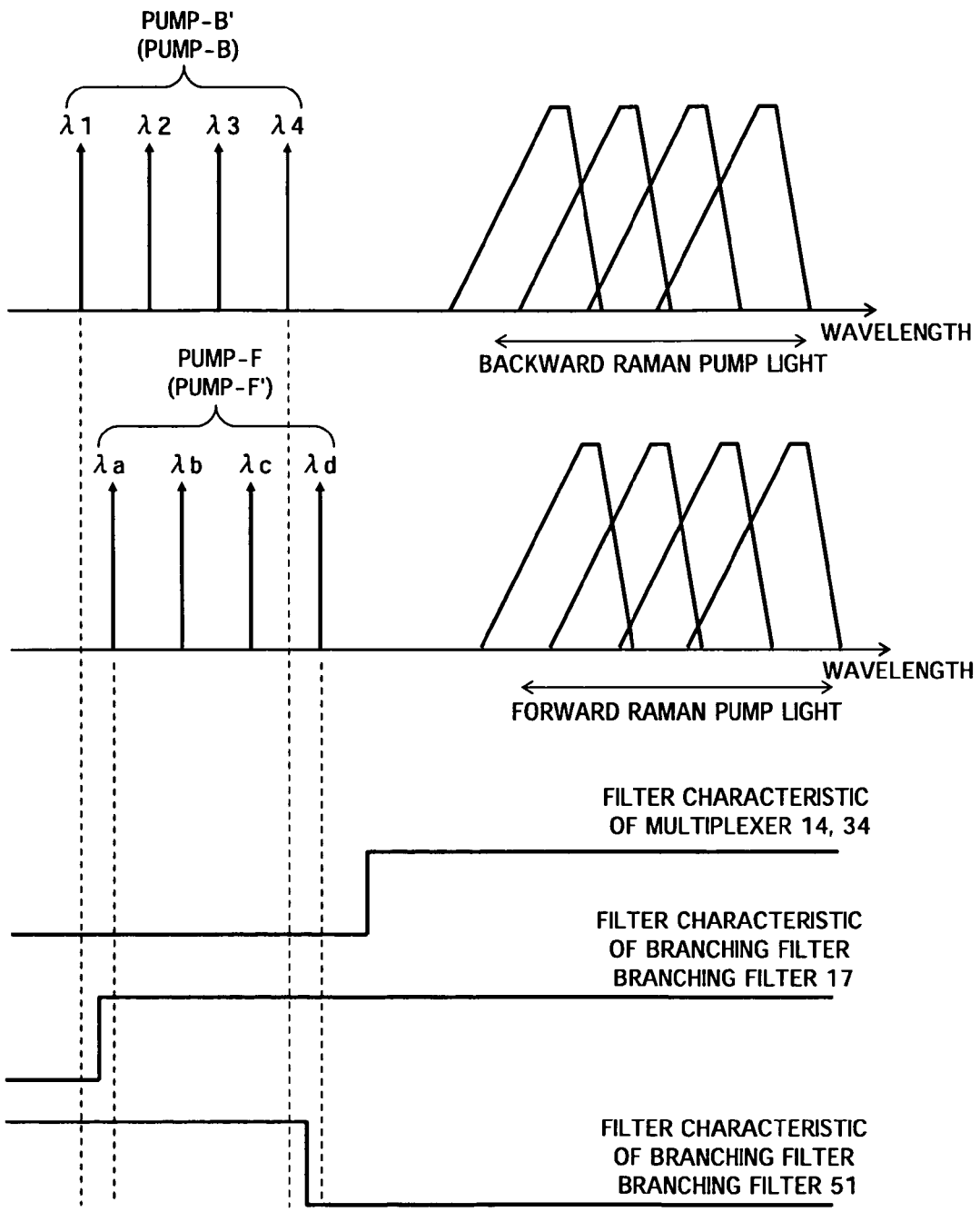
FIG. 11 is a diagram for explaining wavelength arrangements of backward Raman pump light and forward Raman pump light in the fourth embodiment.

The pump light source 40 has a plurality of (here for example, four) pump light sources 401-1, 401-2, 401-3, and 4014, a multiplexer (MUX) 402, and multiplier circuits 404-1, 404-2, 404-3, and 404-4. The wavelengths of the respective pump light sources 401-1 to 401-4 are set, as illustrated in FIG. 11, shifted toward the long wavelength side (or may be toward the short wavelength side) with respect to the wavelengths λ1 to λ4 of the backward Raman pump light PUMP-B. Here it is assumed that the wavelengths of the forward Raman pump light are λa, λb, λc, and λd sequentially from the short wavelength side. The multiplexer 402 multiplexes the output lights from the respective pump light sources 401-1 to 401-4 and outputs the multiplexed light. The forward Raman pump light PUMP-F multiplexed by the multiplexer 402 is input to the multiplexer 44 via the branching filter 17, and provided to the optical transmission line 1 on the uplink side, to propagate on the optical transmission line 1 in the same direction as the main signal light SIG. The multiplier circuits 404-1 to 404-4 respectively generate a drive signal corresponding to a required pump light power ratio by multiplying a drive signal provided from the pump-light drive control circuit 41 to the respective pump light sources 401-1 to 401-4 by a coefficient signal output from the coefficient setting circuit 103, which is used in common for the backward Raman pump light.

The pump-light drive control circuit 41 controls the pump light sources 401-1 to 401-4 so that the total power of the forward Raman pump light PUMP-F becomes constant at the time of normal operation (automatic power control: APC), and also performs output safety control of the forward Raman pump light PUMP-F according to the detection result of the modulated-component detection circuit 19, at the time of confirming the connection of the optical transmission line.

The modulation signal generation circuit 42, at the time of confirming the connection of the optical transmission line, modulates the intensity of the forward Raman pump light PUMP-F with a predetermined frequency to generate a modulation signal for transmitting the response signal RES to the downstream side. The response signal RES is transmitted in response to the reception of the pilot signal PIL on the same link side, not to the reception of the pilot signal PIL' on the opposite link side. In the optical transmission system, as described later, transfer of the pilot signal PIL and the response signal RES on the uplink side and transfer of the pilot signal PIL' and the response signal RES' on the downlink side are performed independently. Moreover, the pilot signal is transmitted by modulation of the backward Raman pump light, and the response signal is transmitted by modulation of the forward Raman pump light having a different wavelength to that of the backward Raman pump light. Therefore a modulation signal corresponding to the pilot signal and a modulation signal corresponding to the response signal may have the same or different frequencies.

The superposing circuit 43 has an inverter circuit 431, multiplier circuits 432-3 and 4324, and adder circuits 433-3 and 4334. The inverter circuit 431 generates a signal in which a phase of the modulation signal output from the modulation signal generation circuit 42 is inverted, and outputs the inverted signal here to the multiplier circuit 432-4 corresponding to the pump light source 401-4 on the long wavelength side. The multiplier circuit 432-4 multiplies the output signal from the inverter circuit 431 by the coefficient signal corresponding to the pump light source 401-4 output from the coefficient setting circuit 103. The multiplier circuit 432-3 multiplies the modulation signal (modulation signal for which the phase has not been inverted by the inverter circuit 431) output from the modulation signal generation circuit 42 by the coefficient signal corresponding to the pump light source 401-3 output from the coefficient setting circuit 103. By combination of the inverter circuit 431 and the multiplier circuits 432-3 and 432-4, a modulation signal having a complementary relationship, and which has been subjected to weighting corresponding to the power ratio of the pump light, is generated. The adder circuits 433-3 and 433-4 respectively superpose the modulation signals output from the multiplier circuits 432-3 and 432-4 on the drive signals provided from the pump-light drive control circuit 41 to the pump light sources 401-3 and 401-4. The drive signals superposed with the modulation signals in the adder circuits 433-3 and 4334 are respectively provided to the multiplier circuits 404-3 and 404-4.

The branching filter 51 is for extracting the forward Raman pump light PUMP-F' that has propagated on the optical transmission line 1' on the downlink side from the upstream side. Here a wavelength separation filter capable of separating the wavelength λd from the forward Raman pump light PUMP-F' is inserted on the optical path between the multiplexers 14 and 102. The optical detector 52 photoelectrically converts the light having the wavelength λd separated by the branching filter 51 and outputs this to the modulated-component detection circuit 19. Upon reception of the electric signal output from the optical detector 52, the modulated-component detection circuit 19 detects whether a modulated component is included in the electric signal.

The branching filter 17 arranged between the multiplexers 44 and 402 corresponding to the forward Raman pump light is for extracting the backward Raman pump light PUMP-B that has propagated on the optical transmission line 1 from the downstream side. Here a wavelength separation filter capable of separating the wavelength λ1 from the backward Raman pump light PUMP-B is used. Respective filter characteristics of the multiplexers 14 and 34 and the branching filters 17 and 51 are illustrated on the lower side of FIG. 11.

In the Raman amplifier 2A having the above-described configuration, at the time of confirming the connection of the optical transmission line, as in the third embodiment, intensity modulation is performed in a complementary manner with respect to the wavelengths λ1 and λ2 of the backward Raman pump light PUMP-B' on the short wavelength side, to thereby transmit the pilot signal PIL' for connection confirmation of the optical transmission line 1' on the downlink side. Moreover, intensity modulation is performed in a complementary manner with respect to the wavelengths λc and λd of the forward Raman pump light PUMP-F on the long wavelength side, to thereby transmit the response signal RES for connection confirmation of the optical transmission line 1 on the uplink side.

A connection confirmation operation of the optical transmission line 1 on the uplink side is described here. Since the connection confirmation operation of the optical transmission line 1' on the downlink side is the same as that on the uplink side, description thereof is omitted.

At first, as in the third embodiment, the backward Raman pump light PUMP-B in which intensity modulation has been applied in a complementary manner with respect to the wavelengths λ1 and λ2, is transmitted to the optical transmission line 1 in the low output state from the Raman amplifier at a node on the downstream side of the node A. When the backward Raman pump light PUMP-B propagates on the optical transmission line 1 and reaches the node A on the upstream side, the backward Raman pump light PUMP-B is extracted toward the branching filter 17 side by the multiplexer 44 of the Raman amplifier 2A. The branching filter 17 separates the light of the wavelength λ1 from the backward Raman pump light PUMP-B and outputs the separated light to the optical detector 18. An electric signal photoelectrically converted by the optical detector 18 is then transmitted to the modulated-component detection circuit 19. The modulated-component detection circuit 19 detects whether a modulated component is included in the output signal from the optical detector 18, and transmits the detection result to the pump-light drive control circuit 41 and the modulation signal generation circuit 42 on the forward Raman pump light side. In the modulation signal generation circuit 42, reception of the pilot signal PIL from the downstream side is confirmed by detecting the modulated component by the modulated-component detection circuit 19, to generate a modulation signal of a required frequency. Moreover also in the pump-light drive control circuit 41, reception of the pilot signal PIL from the downstream side is confirmed by detecting the modulated component by the modulated-component detection circuit 19, to generate a drive signal for APC-operating the pump light source 40. As a result, the forward Raman pump light PUMP-F in which intensity modulation has been applied in a complementary manner with respect to the wavelengths $\lambda c$ and $\lambda d$, is generated by the pump light source 40, to thereby transmit the response signal RES to the optical transmission line 1.

When modulation is applied to the forward Raman pump light PUMP-F, the influence of the modulation on the main signal light becomes more noticeable than in the case of the backward Raman pump light. That is to say, as described above, since the Raman gain is determined by the product of the power of the main signal light and the power of the Raman pump light, the Raman gain changes when the main signal light is at the high level and when the main signal light is at the low level. When the main signal light (WDM signal light) is Raman-amplified by the forward pumping, high level wavelength channels and low level wavelength channels overlap on each other at random. Therefore, the Raman gain changes due to the influences of both the change in the main signal light level and the modulation of the forward Raman pump light. On the other hand, in the case of the backward excitation, since the main signal light and the Raman pump light proceed in opposite directions, the influences due to the change in the main signal light level and the modulation of the backward Raman pump light are averaged. Accordingly, the intensity of the main signal light Raman-amplified by the forward excitation tends to fluctuate more easily, as compared to the intensity of the main signal light Raman-amplified by the backward excitation. Therefore, when the forward Raman pump light is used in common, it is particularly important to apply modulation in the complementary manner by selecting one pair of forward Raman pump lights having adjacent wavelengths.

When the response signal RES obtained by modulation of the forward Raman pump light PUMP-F propagates on the optical transmission line 1 and reaches the node on the downstream side, the light of wavelength $\lambda d$ is separated from the forward Raman pump light PUMP-F and the modulated component is detected, to confirm the reception of the response signal RES from the upstream side, thereby changing over the backward Raman pump light to the high output state at the time of the normal operation.

As described above, according to the optical transmission system where the forward Raman pump light is used in common, connection of the pair of optical transmission lines 1 and 1' for connecting between the nodes can be confirmed independently.

Figure 12:
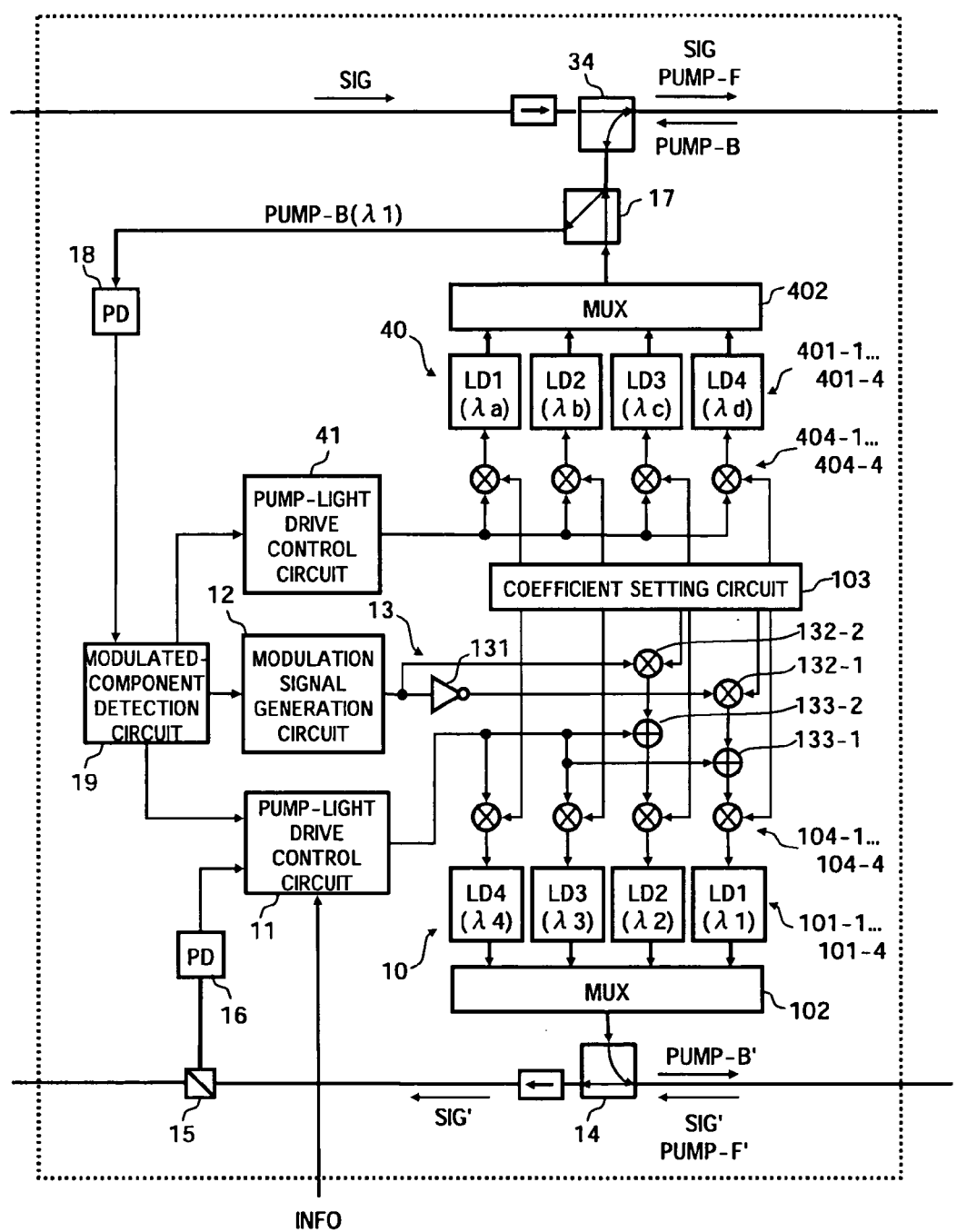
FIG. 12 is a block diagram illustrating another configuration example of a Raman amplifier associated with the fourth embodiment.

In the fourth embodiment, an example in which modulation is applied to the forward Raman pump light to transmit the response signal has been described. However, even in the case of where the forward Raman pump light is used in common, the pilot signal and the response signal can be transmitted by modulating the backward Raman pump light with the frequencies f1 and f2, as in the aforementioned third embodiment. A configuration example of the Raman amplifier 2A in this case is illustrated in FIG. 12.

What is claimed is:

1. An optical transmission system comprising a plurality of nodes on first and second transmission lines corresponding to an uplink and a downlink, and with each node equipped with a Raman amplifying device for Raman-amplifying each main signal light transmitted on the first and second transmission lines, wherein
the Raman amplifying device comprising:
a pump light generating section that generates backward Raman pump light for Raman-amplifying the main signal light transmitted on the first optical transmission line, and provides the backward Raman pump light to the first optical transmission line;
a pump light modulating section that modulates the backward Raman pump light generated by the pump light generating section to thereby transmit a pilot signal for confirming a connection state of the first optical transmission line from a first node positioned on a downstream side of the first optical transmission line to a second node positioned on an upstream side of the first optical transmission line;
a modulated-component detecting section that receives backward Raman pump light propagating on the second optical transmission line, and detects whether a modulated component corresponding to a response signal indicating that the pilot signal transmitted from the first node to the first optical transmission line is received by the second node is included in the received backward Raman pump light; and
a pump light controlling section that controls a power of the backward Raman pump light generated in the pump light generating section to a normal operation level when a modulated component corresponding to the response signal is detected by the modulated-component detecting section, and controls a power of the backward Raman pump light generated in the pump light generating section to a safe level when a modulated component corresponding to the response signal is not detected by the modulated-component detecting section.

2. An optical transmission system according to claim 1, wherein
the pump light generating section has a plurality of pump light sources having different wavelengths, and multiplexes the pump light output from the respective pump light sources and provides this to the first transmission line; and
the pump light modulating section selects two pump lights having adjacent wavelengths, out of the pump lights output from each of the pump light sources, and modulates each in a complementary relationship.

3. An optical transmission system according to claim 2, wherein
the pump light modulating section selects two pump lights having adjacent wavelengths on a short wavelength side, out of the pump lights output from the plurality of pump light sources.

4. An optical transmission system according to claim 1, wherein
the pump light modulating section modulates the intensity of backward Raman pump light generated by the pump light generating section according to a modulation signal having a first frequency, to thereby transmit a pilot signal from the first node to the second node, and the modulated-component detecting section detects a modulated component having a second frequency different to the first frequency, as a modulated component corresponding to a response signal.

5. An optical transmission system according to claim 1, wherein
the pump light modulating section modulates pump light generated by the pump light generating section according to a first code, to thereby transmit a pilot signal from the first node to the second node, and
the modulated-component detecting section detects a modulated component conforming to a second code different to the first code, as a modulated component corresponding to a response signal.

6. An optical transmission system according to claim 1, wherein
the Raman amplifying device comprises a main signal light detecting section that detects a power of main signal light that has propagated through the first transmission line and been Raman amplified, and
the pump light controlling section, at the time of normal operation, controls a power of backward Raman pump light generated by the pump light generating section, so that the main signal light power detected by the main signal light detecting section is within a previously determined range.

7. An optical transmission system according to claim 1, wherein
the Raman amplifying device comprises a main signal light detecting section that detects a power of main signal light that has propagated through the first transmission line and been Raman amplified, and
the pump light controlling section, at the time of normal operation, controls a power of backward Raman pump light generated by the pump light generating section, so that a Raman gain obtained based on the main signal light power detected by the main signal light detecting section becomes constant.

8. An optical transmission system according to claim 1, wherein:
the plurality of nodes each have an optical supervisory channel transmitting and receiving device for transmitting and receiving an optical supervisory channel via the first and second transmission lines;
the pump light generating section is configured to generate backward Raman pump light capable of Raman-amplifying the main signal light and an optical supervisory channel transmitted on the first transmission line; and
the pump light controlling section is configured to stop modulation of the backward Raman pump light by the pump light modulating section, when reception of an optical supervisory channel transmitted from the second node to the first node via the first optical transmission line is confirmed.

9. A method of controlling an optical transmission system that comprises a plurality of nodes on first and second transmission lines corresponding to an uplink and a downlink, and that transmits main signal lights propagated through the first and second transmission lines, between each node while Raman-amplifying, the method comprising:
modulating backward Raman pump light for Raman-amplifying the main signal light transmitted on the first optical transmission line, to thereby transmit a pilot signal for confirming a connection state of the first optical transmission line from a first node positioned on a downstream side of the first optical transmission line to a second node positioned on an upstream side of the first optical transmission line;
receiving at the second node backward Raman pump light propagating on the first optical transmission line, and detecting whether a modulated component corresponding to the pilot signal is included in the received backward Raman pump light;
when a modulated component corresponding to the pilot signal is detected, modulating at the second node backward Raman pump light for Raman-amplifying the main signal light transmitted by the second optical transmission line, to thereby transmit a response signal indicating reception of the pilot signal, from the second node to the first node via the second optical transmission line;
receiving at the first node backward Raman pump light propagating on the second optical transmission line, and detecting whether a modulated component corresponding to the response signal is included in the received backward Raman pump light; and
controlling a power of backward Raman pump light provided from the first node to the first optical transmission line, to a normal operation level when the modulated component corresponding to the response signal is detected, and controlling a power of backward Raman pump light provided from the first node to the first optical transmission line, to a safe level when the modulated component corresponding to the response signal is not detected.

* * * * *